United States Patent
Lee et al.

(10) Patent No.: US 8,861,092 B2
(45) Date of Patent: Oct. 14, 2014

(54) DEVICE AND METHOD FOR CONTROLLING CURVATURE

(75) Inventors: Eun-sung Lee, Hwaseong-si (KR);
Min-seog Choi, Seoul (KR);
Jong-hyeon Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 13/451,653

(22) Filed: Apr. 20, 2012

(65) Prior Publication Data
US 2013/0077178 A1    Mar. 28, 2013

(30) Foreign Application Priority Data

Sep. 26, 2011 (KR) .......................... 10-2011-0096988

(51) Int. Cl.
*G02B 1/06* (2006.01)
*G02B 26/00* (2006.01)
*G02B 3/14* (2006.01)

(52) U.S. Cl.
CPC ................ *G02B 3/14* (2013.01); *G02B 26/005* (2013.01)
USPC ....................................... 359/665

(58) Field of Classification Search
CPC .......... G02B 3/12; G02B 3/14; G02B 26/004; G02B 26/005; G02C 7/085
USPC .................................................. 359/665–667
See application file for complete search history.

(56) References Cited

U.S. PATENT DOCUMENTS

2008/0186709 A1* 8/2008 Kuiper et al. ................. 362/277

FOREIGN PATENT DOCUMENTS

| JP | 2011053706 A | 3/2011 |
| KR | 1020060130245 A | 12/2006 |
| KR | 100797723 B1 | 1/2008 |
| KR | 1020100052115 A | 5/2010 |

* cited by examiner

*Primary Examiner* — Joseph P Martinez
(74) *Attorney, Agent, or Firm* — Sughrue Mion, PLLC

(57) ABSTRACT

A curvature control device includes: a first fluid having a light transmitting property and a polarity; a second fluid that has a light transmitting property and is not mixed with the first fluid; a chamber forming an inner space for containing the first fluid F1 and the second fluid F2 and including a lens area in which an interface between the first fluid and the second fluid forms an optical interface, and a plurality of channel areas in which another interface between the first fluid and the second fluid functions as a driving interface for inducing a variation in curvature of the optical interface; and an electrode portion generating an electric field for varying a position of the driving interface.

32 Claims, 12 Drawing Sheets

DEVICE AND METHOD FOR CONTROLLING CURVATURE

CROSS-REFERENCE TO RELATED APPLICATION

This application claims priority from Korean Patent Application No. 10-2011-0096988, filed on Sep. 26, 2011, in the Korean Intellectual Property Office, the disclosure of which is incorporated herein in its entirety by reference.

BACKGROUND

1. Field

Apparatuses and methods consistent with exemplary embodiments relate to a device and a method of controlling curvature of a lens surface by using a microelectrofluidic method.

2. Description of the Related Art

A lens is a basic component of various kinds of imaging apparatuses such as cameras or the like, and collects or disperses light by refracting light at a boundary surface between two different mediums.

A focal length of a lens is determined according to the curvature of the lens surface and a material for forming the lens. Recently, in order to obtain an image having a higher quality, demand for a lens system having a variable focusing function has increased. The variable focusing function may be used in auto-focusing or zooming. The auto-focusing or zooming may use a method of mechanically moving some lenses constituting the lens system by using, for example, a motor, or may use a method of changing the curvature of the lens surface by using a liquid lens.

The liquid lens includes a pressure type liquid lens, an electrowetting type liquid lens, and the like according to a driving method of changing the curvature of a lens surface. The pressure type liquid lens changes curvature of a lens surface by applying pressure to liquid by using a pump or an actuator. The electrowetting type liquid lens changes a contact angle of liquid by applying a voltage between a conductive liquid and a driving electrode coated with a dielectric material and thus changes curvature of a lens surface.

SUMMARY

According to one or more exemplary embodiments, there is provided a device and a method for controlling curvature of a lens surface using a microelectrofluidic method.

Additional aspects are set forth in part in the description which follows and, in part, will be apparent from the description, or may be learned by practicing described exemplary embodiments.

According to an aspect of an exemplary embodiment, a curvature control device includes: a first fluid having a light transmitting property and a polarity; a second fluid that has a light transmitting property and is not mixed with the first fluid; a chamber forming an inner space for containing the first fluid F1 and the second fluid F2, the chamber including a lens area in which an interface between the first fluid and the second fluid forms a lens surface, and a plurality of channel areas in which another interface between the first fluid and the second fluid functions as a driving surface for inducing a variation in curvature of the lens surface; and an electrode portion generating an electric field for varying a position of the driving surface, wherein the plurality of channel areas include: at least one main channel in which a first driving surface is formed of an interface between the first fluid and the second fluid to induce a variation in curvature of the lens surface; and at least one sub-channel in which a second driving surface is formed of another interface between the first fluid and the second fluid to induce a variation in curvature of the lens surface, wherein the at least one sub-channel adjusts a curvature of the lens surface relatively minutely compared to the at least one main channel.

The first fluid may be a polar liquid, and the second fluid may be a gas or a non-polar liquid. The curvature control device may further include a grounding electrode formed to contact the first fluid.

Positions of the first driving surface and the second driving surface may be varied in a circumferential direction surrounding the lens area. For example, a position of the first driving surface may be varied in a circumferential direction of a first radius, and a position of the second driving surface may be varied in a circumferential direction of a second radius that is smaller than the first radius.

The chamber may include: an upper substrate and a lower substrate that are separated from each other; and an intermediate structure that is disposed between the upper and lower substrates and divides the lens area and the plurality of channel areas such that the first fluid flows between the areas, wherein the intermediate structure includes a lens hole corresponding to the lens surface and a through hole which is a path through which the second fluid flows in the main channel and the sub-channel.

The electrode portion may include a first electrode portion formed in the main channel and a second electrode portion formed in the sub-channel.

The first electrode portion may include an electrode that is formed on the lower substrate, has a form corresponding to the main channel, and is coated with an insulating material. The second electrode portion may include an electrode that is formed on the lower substrate, has a form corresponding to the sub-channel, and is coated with an insulating material.

The positions of the first driving surface and the second driving surface may be adjusted by adjusting a voltage applied to each of the first electrode portion and the second electrode portion.

The first electrode portion may include a plurality of electrodes that are arranged on portions of the lower substrate corresponding to the main channel along the circumferential direction of the first radius and have a cut-away fan-shape or trapezoidal shape and are coated with an insulating material. The second electrode portion may include a plurality of electrodes that are arranged on portions of the lower substrate corresponding to the sub-channel along the circumferential direction of the second radius and have a cut-away fan-shape or trapezoidal shape and are coated with an insulating material.

The positions of the first driving surface and the second driving surface may be adjusted by selecting an electrode from each of the first electrode portion and the second electrode portion, to which a voltage is to be applied.

A voltage to be applied to the plurality of electrodes of the first electrode portion and the plurality of electrodes of the second electrode portion may be adjusted independently.

The plurality of electrodes of the first electrode portion may be each electrically connected to one of three common electrodes, and adjacent electrodes may be arranged to be connected to different common electrodes. The plurality of electrodes of the second electrode portion may be each electrically connected to one of three common electrodes, and adjacent electrodes may be arranged to be connected to different common electrodes.

A portion of the lower substrate corresponding to the lens area may be coated with a material having hydrophilic properties.

A portion inside the main channel is coated with a material having hydrophilic properties. At least two portions inside the main channel, which are separated from each other, may be coated with a material having hydrophilic properties.

A portion inside the sub-channel may be coated with a material having hydrophilic properties. At least two portions inside the sub-channel, which are separated from each other, may be coated with a material having hydrophilic properties.

Positions of the first driving surface and the second driving surface may be varied along a radial direction of the lens area. A plurality of main channels and a plurality of sub-channels may be included, which are respectively spaced apart and alternately arranged along a circumferential direction of the lens area.

The electrode portion may include a first electrode portion formed in each of the plurality of main channels and a second electrode portion formed in each of the plurality of sub-channels. The first electrode portion may include at least one electrode that has a cut-away ring shape or a cut-away fan-shape or a cut-away trapezoidal shape and is coated with an insulating material. The second electrode portion may include at least one electrode that has a cut-away ring shape or a cut-away fan-shape or a cut-away trapezoidal shape and is coated with an insulating material.

A position of the first driving surface may be varied in the radial direction of the lens area, and a position of the second driving surface may be varied along a circumferential direction of the lens area.

The electrode portion may include a first electrode portion formed in the main channel and a second electrode portion formed in the sub-channel, wherein the first electrode portion includes a plurality of electrodes that have a ring shape and are coated with an insulating material, and are spaced apart from one another in the radial direction, and the second electrode portion includes a plurality of electrodes that have a cut-away fan-shape or trapezoidal shape and are coated with an insulating material, and are spaced apart from one another in the circumferential direction.

According to another aspect of an exemplary embodiment, a curvature control device includes: a first fluid having a light transmitting property and a polarity; a second fluid that has a light transmitting property and is not mixed with the first fluid; a chamber forming an inner space for containing the first fluid F1 and the second fluid F2, the chamber including a lens area in which an interface between the first fluid and the second fluid forms a lens surface, and a plurality of channel areas in which another interface between the first fluid and the second fluid functions as a driving surface for inducing a variation in curvature of the lens surface; and an electrode portion generating an electric field for varying a position of the driving surface, wherein the position of the driving surface is varied in a circumferential direction surrounding the lens surface.

The electrode portion may include: a plurality of electrodes that are arranged along a circumferential direction of a first radius and have a cut-away fan-shape or trapezoidal shape and are coated with an insulating material; and a plurality of electrodes that are arranged along a circumferential direction of a second radius that is greater than first radius and have a cut-away fan-shape or trapezoidal shape and are coated with an insulating material.

According to another aspect of an exemplary embodiment, an imaging apparatus includes: an imaging lens unit including the curvature control device; a control unit controlling a voltage for adjusting a curvature of a lens surface of the curvature control device; and an image sensor converting an optical image formed by the imaging lens unit, to an electrical signal.

According to another aspect of an exemplary embodiment, a method of adjusting a curvature of a lens surface formed by an interface between two fluids that are transmittive and have different refractive indices, wherein the curvature is adjusted by using flows of the two fluids, the method including: forming a lens area including the lens surface and a channel area for adjusting the flows of the two fluids, in a space where the two fluids are contained; and adjusting the flows of the two fluids by combining a main adjustment operation with a relatively large basic unit of flow amount and a sub-adjustment operation with a relatively small basic unit of flow amount in the channel area.

BRIEF DESCRIPTION OF THE DRAWINGS

The above and/or other aspects will become apparent by describing certain exemplary embodiments, with reference to the accompanying drawings, in which.

DETAILED DESCRIPTION

Figure 1:
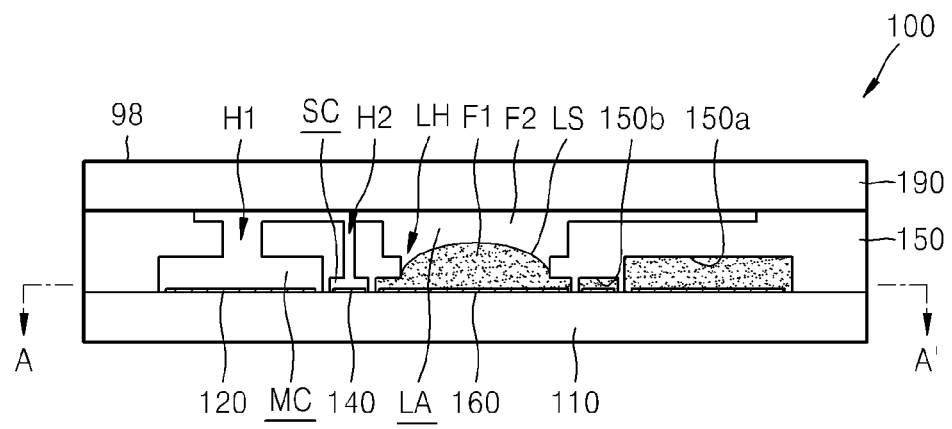
FIG. 1 is a schematic side cross-sectional view of a curvature control device, according to an exemplary embodiment.

Certain exemplary embodiments are described in detail below, with reference to the accompanying drawings, wherein the like reference numerals refer to the like elements even in the different drawings. Also, in the drawings, the thicknesses of layers and regions may be exaggerated for clarity. In this regard, exemplary embodiments may have different forms and should not be construed as being limited to the descriptions set forth herein. Accordingly, exemplary embodiments are merely described below, by referring to the figures, to explain certain aspects. As used herein, the term "and/or" includes any and all combinations of one or more of the associated listed items. Expressions such as "at least one of," when preceding a list of elements, modify the entire list of elements and do not modify the individual elements of the list.

The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the invention with unnecessary detail.

According to a method of controlling curvature according to an exemplary embodiment, an interface between two light transmitting fluids having different refractive indices is used as a lens surface, and a curvature of the lens surface is adjusted by using a flow of the fluid. In a space where the two fluids are contained, a lens region including the lens surface and a channel area for adjusting a flow of the fluid are formed, and the flow of the two fluids is adjusted by combining a main adjustment operation with a relatively large basic unit of a flow amount and a sub-adjustment operation with a relatively small basic unit of a flow amount in the channel area.

A curvature control device using the above-described curvature control method may be configured in any of various forms according to a detailed structure of a chamber in which the first and second fluids are accommodated and an arrangement of the electrode included in an electrode portion for driving the boundary surface between the first fluid and the second fluid. Hereinafter, various exemplary embodiments of the curvature control device are described.

Figure 2:
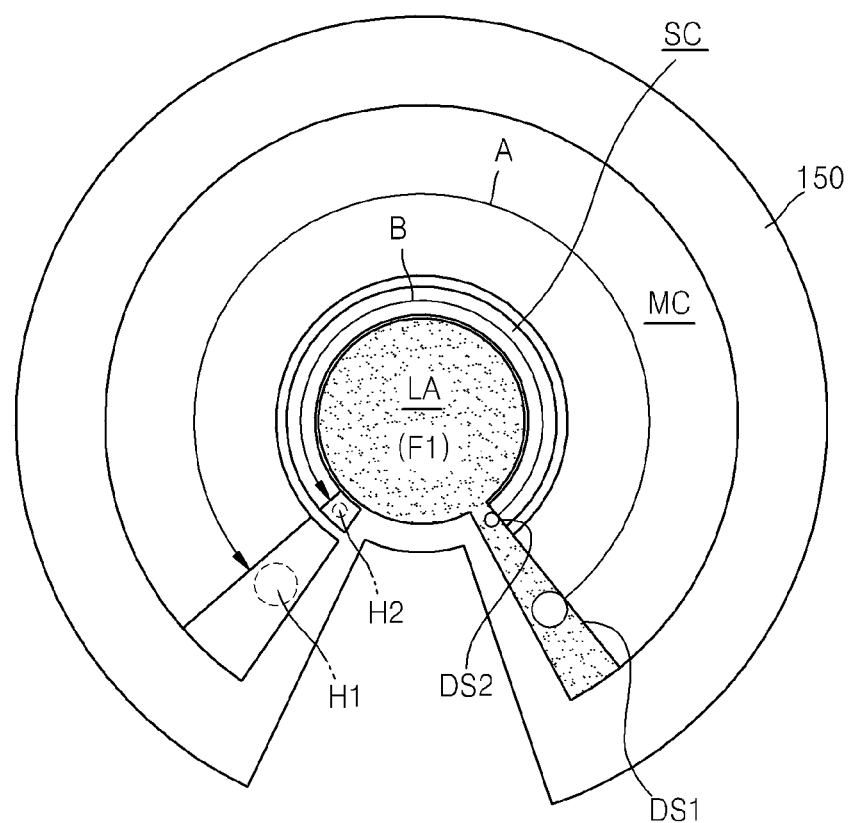
FIG. 2 is a plan view illustrating a channel structure and a fluid flow path of the curvature control device of FIG. 1.
Figure 3:
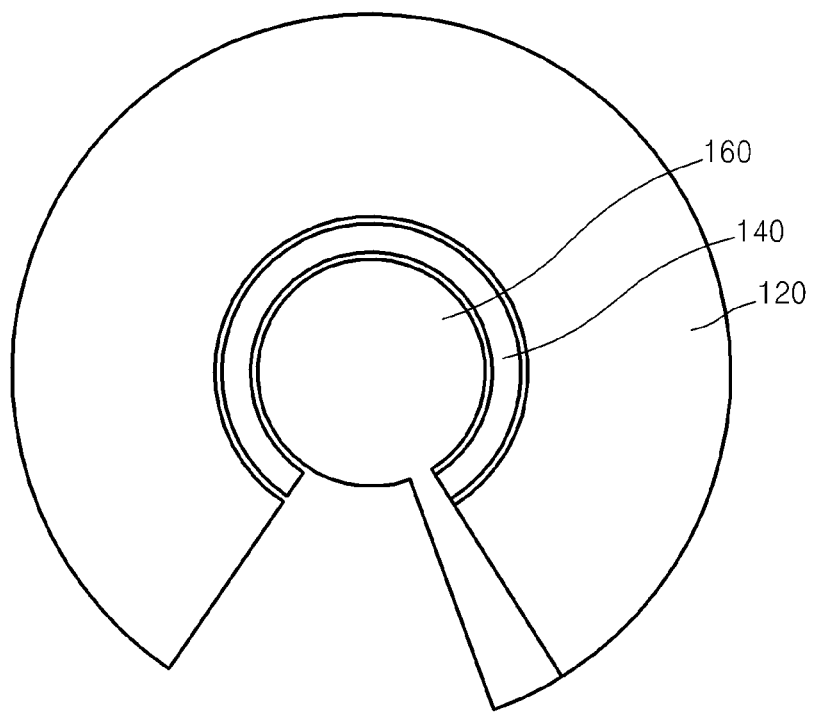
FIG. 3 illustrates an electrode structure formed in the curvature control device of FIG. 1 and an initial state of a first fluid.

FIG. 1 is a side cross-sectional view schematically illustrating a curvature control device 100 according to an exemplary embodiment. FIG. 2 is a plan view illustrating a channel structure and a fluid flow path of the curvature control device 100 of FIG. 1. FIG. 3 illustrates an electrode structure formed in the curvature control device 100 of FIG. 1.

Referring to FIGS. 1 through 3, the curvature control device 100 includes: a first fluid F1 that has light transmitting property and has a polarity; a second fluid F2 that is not mixed with the first fluid F1 and has light transmitting property; a chamber 98 forming an inner space for containing the first fluid F1 and the second fluid F2, and including a lens area LA and a plurality of channel areas; and an electrode portion. The lens area LA includes a lens surface LS formed by an interface between the first fluid F1 and the second fluid F2; the plurality of channel areas in which another interface between the first fluid F1 and the second fluid F2 functions as a driving surface that induces a variation in curvature of the lens surface LS; and the electrode portion which is included to form an electric field varying a position of the driving surface.

The plurality of channel areas include at least one main channel MC in which a first driving surface DS1 is formed, which induces a variation in curvature of the lens surface LS and is an interface between the first fluid F1 and the second fluid F2, and at least one sub-channel SC in which a second driving surface DS2 is formed, which is another interface between the first fluid F1 and the second fluid F2 and induces a curvature variation of the lens surface LS, wherein the sub-channel SC adjusts the curvature of the lens surface LS relatively minutely compared to the main channel MC.

The configuration and function of the curvature control device 100 is described in detail below.

As illustrated in FIG. 1, the chamber 98 includes an upper substrate 190, a lower substrate 110 which are separated from each other, and an intermediate structure 150 which is disposed between the upper substrate 190 and a lower substrate 110, divides lens area LA and a plurality of channel areas, and is formed to enable the first fluid F1 to flow between the areas. A lens hole LH corresponding to the lens surface LS, a first through hole H1 forming a path through which the second fluid F2 flows in the main channel MC, and a second through hole H2 forming a path through which the second fluid F2 flows in the sub-channel SC are formed in the intermediate structure 150.

The lower substrate 110, the intermediate structure 150, and the upper substrate 190 may be formed of a material with a light-transmitting property. The first fluid F1 and the second fluid F2 may have light-transmitting property and have different refractive indices. The first fluid F1 may be formed of a non-polar liquid, and the second fluid F2 may be formed of a gas or a non-polar liquid.

The electrode portion may include a first electrode portion 120 formed in the main channel MC and a second electrode portion 140 formed in the sub-channel SC. As illustrated in FIG. 3, the first electrode portion 120 may include an electrode that is disposed on the lower substrate 110 and has a form corresponding to the main channel MC, and is coated with an insulating material (not shown). Also, the second electrode portion 140 may include an electrode that is disposed on the lower substrate 110, has a form corresponding to the sub-channel SC, and is coated with an insulating material (not shown).

While the electrode portion is illustrated as being formed below the main channel MC and the sub-channel SC, the electrode portion may be formed on the main channel MC and the sub-channel SC, that is, on lower surfaces 150a and 150b of the intermediate structure 150.

Also, the curvature control device 100 may further include a grounding electrode 160 that is disposed to contact the first fluid F1. The grounding electrode 160 is disposed on the lower substrate 110 and is illustrated as including most portions of the lens area LA and some portions of the main channel MC having a cut-away fan-shape or trapezoidal form and some portions of the sub-channel SC also having a cut-away fan-shape or trapezoidal form, but is not limited thereto; the grounding electrode 160 may be disposed at any position where it may contact the first fluid F1 in an initial state where a voltage is not applied, and is not limited to the illustrated form. The grounding electrode 160 may be selectively included; if the grounding electrode 160 is included, a driving voltage may be further reduced.

The lens area LA may be coated with a material having hydrophilic properties because the first fluid F1 exists in the lens area LA. Also, some portions of the main channel MC and some portions of the sub-channel SC may be coated with a material having hydrophilic properties where the first fluid F1 is disposed in an initial stage. Hydrophilic coating may be conducted on the lower substrate 110 corresponding to the some portions of the main channel MC and the sub-channels SC described above, or on an upper surface of the lower substrate 110 and a lower surface of the intermediate structure 150 corresponding to the upper surface of the lower substrate 110. When the grounding electrode 160 having the shape as illustrated in FIG. 3 is formed, the grounding electrode 160 may be coated with a material having hydrophilic properties.

The surface of the rest of the area of the electrode portion which is not coated with a material having hydrophilic properties may be processed with a material having hydrophobic properties.

The first electrode portion 120, the second electrode portion 140, and the grounding electrode 160 may be electrodes formed of a transparent conductive material, for example, a metal oxide such as indium tin oxide (ITO), indium zinc oxide (IZO), or the like; a metal nanoparticle dispersion thin film such as gold (Au), silver (Ag), or the like; a carbon nanostructure such as carbon nanotube (CNT), graphene, or the like; or a conductive polymer material such as poly(3,4-ethylenedioxythiophene) (PEDOT), polypyrrole (PPy), poly (3-hexylthiophene) (P3HT), or the like. The first electrode portion 120, the second electrode portion 140, and the grounding electrode 160 may be formed of a metal thin film such as Au, Ag, aluminum (Al), chrome (Cr), titanium (Ti), or the like when a light transmitting property is not required according to positions thereof.

In the curvature control device 100, pressure applied to the first driving surface DS1 and the second driving surface DS2 changes due to electrowetting driving, and thus, curvature of the lens surface LS is controlled. An electrowetting phenomenon refers to a phenomenon where a contact angle between droplets is changed according to a voltage applied to an electrolyte droplet on an electrode coated with an insulator. That is, on a three-phase contact line (TCL) where a fluid, droplets, and an insulator contact one another, a contact angle is changed according to respective interfacial tensions. When the electrowetting phenomenon is used, movement of a fluid may be rapidly and effectively controlled by using a low voltage, and the fluid may be reversibly transferred and controlled.

According to an exemplary embodiment, the first driving surface DS1 and the second driving surface DS2 are designed to vary in terms of position by electrowetting driving along a circumferential direction around the lens area LA. For example, a position of the first driving surface DS1 is varied along a circumferential direction of a first radius, and a position of the second driving surface DS2 is varied along a circumferential direction of a second radius that is smaller than the first radius. This configuration is implemented so that the main channel MC takes charge of fluid flow on a large scale and the sub-channel SC takes charge of fluid flow within a relatively minute range. Accordingly, a volume of the main channel MC may be designed to be greater than a volume of the sub-channel SC.

An electromechanical force acts on the TCL according to a voltage applied to each of the first electrode portion 120 and the second electrode portion 140 so that the first fluid F1 moves in the main channel MC and the sub-channel SC in a circumferential direction, thereby varying the positions of the first driving surface DS1 and the second driving surface DS2. Here, by adjusting the amplitude of the voltage applied to each of the first electrode portion 120 and the second electrode portion 140, variation of the positions of the first driving surface DS1 and the second driving surface DS2 may be adjusted. The more the positions of the first driving surface DS1 and the second driving surface DS2 vary along arrow directions A and B, the more the first fluid F1 has moved from the lens area LA to the main channel MC and the sub-channel SC, and accordingly, curvature of the lens surface LS is reduced. As a fluid flow amount that causes a variation in curvature of the lens surface LS may be minutely adjusted by using the main channel MC and the sub-channel SC as described above, curvature of the lens surface LS may be adjusted more precisely.

The form of the main channel MC, the form of the sub-channel SC, and the forms of the first electrode portion 120 and the second electrode portion 140 have, instead of a complete ring shape, a ring shape with a portion thereof cut away. The cut-away portion may be used as an area in which wiring or an electrode pad for applying a voltage to the first electrode portion 120 and the second electrode portion 140 is formed. However, the illustrated form is exemplary, and the form may be modified in various ways.

Figure 4:
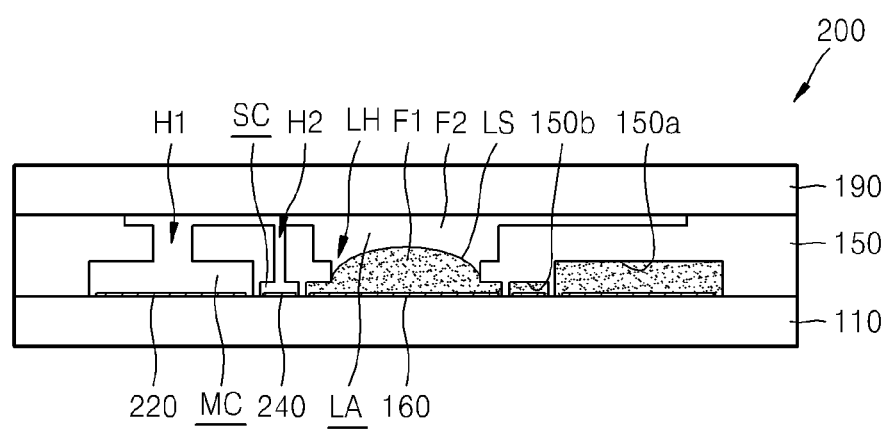
FIG. 4 is a side cross-sectional view schematically illustrating a structure of a curvature control device according to another exemplary embodiment.
Figure 5:
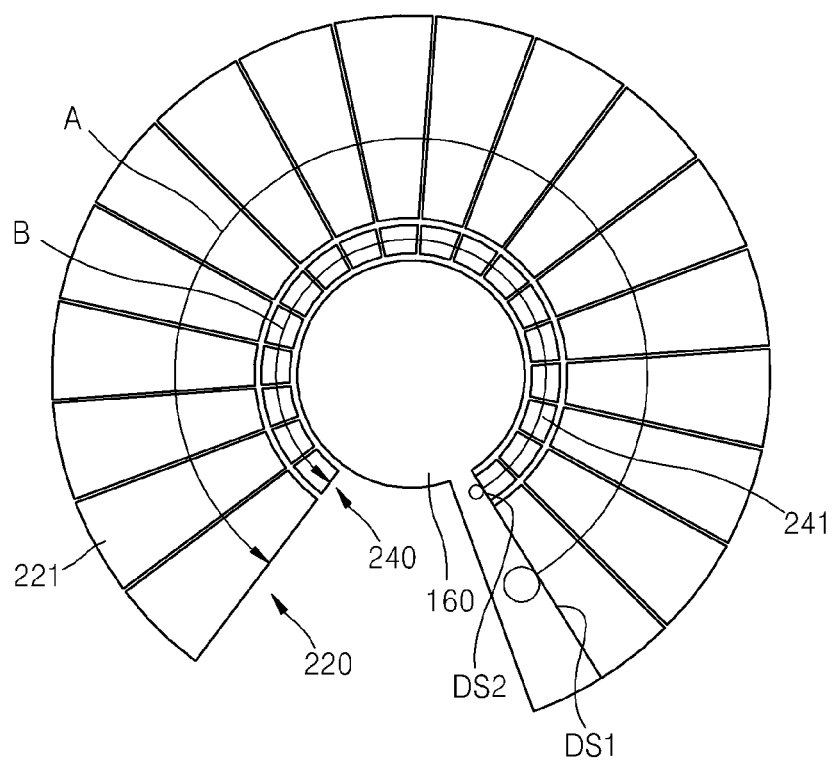
FIG. 5 illustrates an electrode structure formed in the curvature control device of FIG. 4 and a fluid flow path in each of a plurality of channels.

FIG. 4 is a side cross-sectional view schematically illustrating a structure of a curvature control device 200 according to another exemplary embodiment. FIG. 5 illustrates an electrode structure formed in the curvature control device 200 of FIG. 4 and a fluid flow path in each channel.

The curvature control device 200 is different from the curvature control device 100 of the described-above embodiment in that a first electrode portion 220 and a second electrode portion 240 are each formed of a plurality of electrodes.

The first electrode portion 220 includes a plurality of electrodes 221 that are arranged on a lower substrate 110 corresponding to a main channel MC along a circumferential direction of a first radius and have a cut-away fan-shape or trapezoidal shape and are coated with an insulating material. Also, the second electrode portion 240 includes a plurality of electrodes 241 that are arranged on the lower substrate 110 corresponding to a sub-channel SC along a circumferential direction of a second radius and have a cut-away fan-shape or trapezoidal shape and are coated with an insulating material. The sub-channel SC is in charge of causing a fluid to flow in a relatively minute range compared to the main channel MC; for example, the sub-channel SC may have a volume that is approximately similar to a volume corresponding to a basic flow amount in the main channel MC. The basic flow amount in the main channel MC refers to a movement amount of a fluid when a first driving surface DS1 moves in the main channel MC by one electrode 221. A size of the electrode 221 of the first electrode portion 220 and a size of the electrode 241 of the second electrode portion 240 may be determined in consideration of the above-described relation between the main channel MC and the sub-channel SC.

In this configuration, by appropriately selecting an electrode of each of the first electrode portion 220 and the second electrode portion 240 to which a voltage is to be applied, the positions of the first and second driving surfaces DS1 and DS2 may be adjusted. That is, by selecting one of a plurality of electrodes of the first electrode portion 220 and one of a plurality of electrodes of the second electrode portion 240 and applying an appropriate voltage thereto, an electromechanical force acts on a TCL of a driving electrode that is activated in each of the main channel MC and the sub-channel SC, that is, on a tangential line where an insulating material and the first driving surface DS1, which is an interface between the first fluid F1 and the second fluid F2 in the main channel MC, meet each other so that the first driving surface DS1 moves in a direction of an arrow A. Likewise, an electromechanical force acts on a tangential line where an insulating material and the second driving surface DS2, which is an interface between the first fluid F1 and the second fluid F2 in the sub-channel SC, meet each other so that second driving surface DS2 moves in a direction of an arrow B. Movement of the first driving surface DS1 and the second driving surface DS2 denote that the first fluid F1 moves from the lens area LA to the main channel MC and the sub-channel SC, and accordingly, the curvature of the lens surface LS is reduced.

When selectively applying a voltage to some of the plurality of electrodes of the first electrode portion 220 and the second electrode portion 240, the plurality of electrodes of the first electrode portion 220 and the plurality of electrodes of the second electrode portion 240 may be designed such that a voltage is independently applied to each of the electrodes or a minimum number of common electrodes may be included to adjust the voltage to be applied to the plurality of electrodes.

Figure 6:
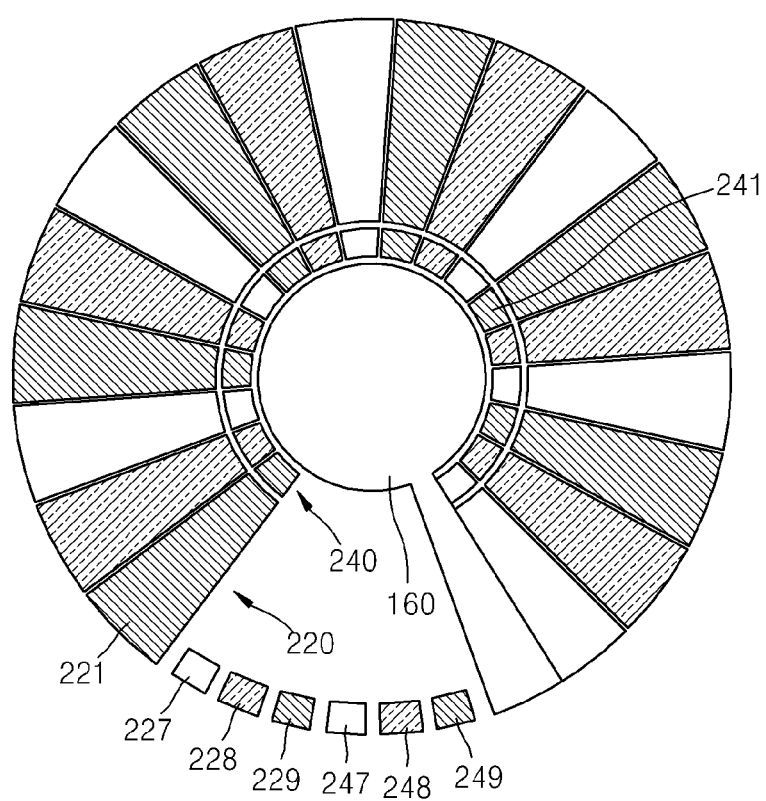
FIG. 6 illustrates a detailed arrangement example of the electrode structure illustrated in FIG. 5.

FIG. 6 illustrates a detailed example of the arrangement of the electrode structure of FIG. 5.

The plurality of electrodes 221 of the first electrode portion 220 are respectively electrically connected to one of three common electrodes 227, 228, or 229. Here, adjacent electrodes may be arranged to be connected to different common electrodes. Also, the plurality of electrodes of the second electrode portion 240 are respectively electrically connected to one of three common electrodes 247, 248, or 249. Here also, adjacent electrodes may be arranged to be connected to different common electrodes.

The above electrode arrangement is relatively simple compared to a configuration in which the plurality of electrodes 221 and 241 are each driven independently.

Figure 7:
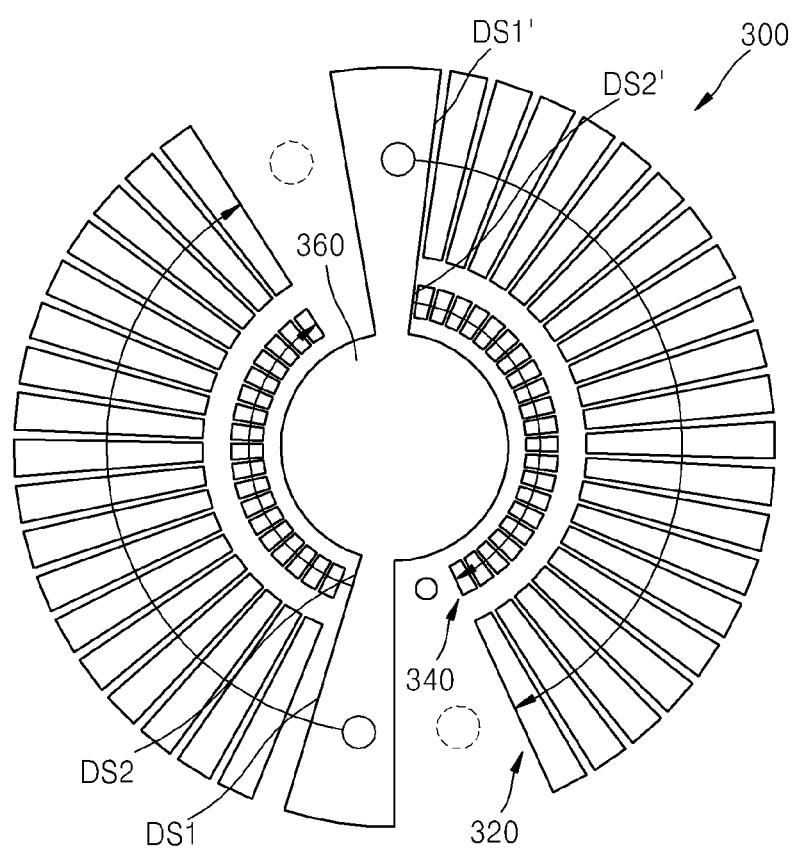
FIG. 7 illustrates an electrode structure which may be included in a curvature control device according to another exemplary embodiment and a fluid flow path in each of a plurality of channels.

FIG. 7 illustrates an electrode structure which may be included in a curvature control device 300 according to another exemplary embodiment and a fluid flow path in each of a plurality of channels.

The curvature control device 300 includes two first driving surfaces DS1 and DS1' in a main channel MC, and two driving second surfaces DS2 and DS2' in a sub-channel SC. In this configuration, a flow rate of a fluid is increased so that a variation in curvature of a lens surface LS varies rapidly.

A first electrode portion 320 formed in the main channel MC includes a plurality of electrodes that are arranged along a circumferential direction of a first radius and have a cut-away fan-shape or trapezoidal shape and are coated with an insulating material. Also, a second electrode portion 340 includes a plurality of electrodes that are arranged along a circumferential direction of a second radius and have a cut-away fan-shape or trapezoidal shape and are coated with an insulating material. A voltage applied to the first electrode portion 320 and the second electrode portion 340 is controlled such that the first electrode portion 320 and the second electrode portion 340 may respectively drive the two first driving surfaces DS1 and DS1' and the two second driving surfaces DS2 and DS2'.

In an initial state where the voltage is not applied, a first fluid F1 is disposed in a lens area LA, two separated areas of the main channel MC, and two separated areas of the sub-channel SC. To this end, the lens area LA, the two areas of the main channel MC, and the two areas of the sub-channel SC may be coated with a material having hydrophilic properties. When a grounding electrode 360 having a form as illustrated in FIG. 7 is formed, the grounding electrode 360 may be coated with a material having hydrophilic properties, but the form of the grounding electrode 360 is not limited thereto.

Figure 8:
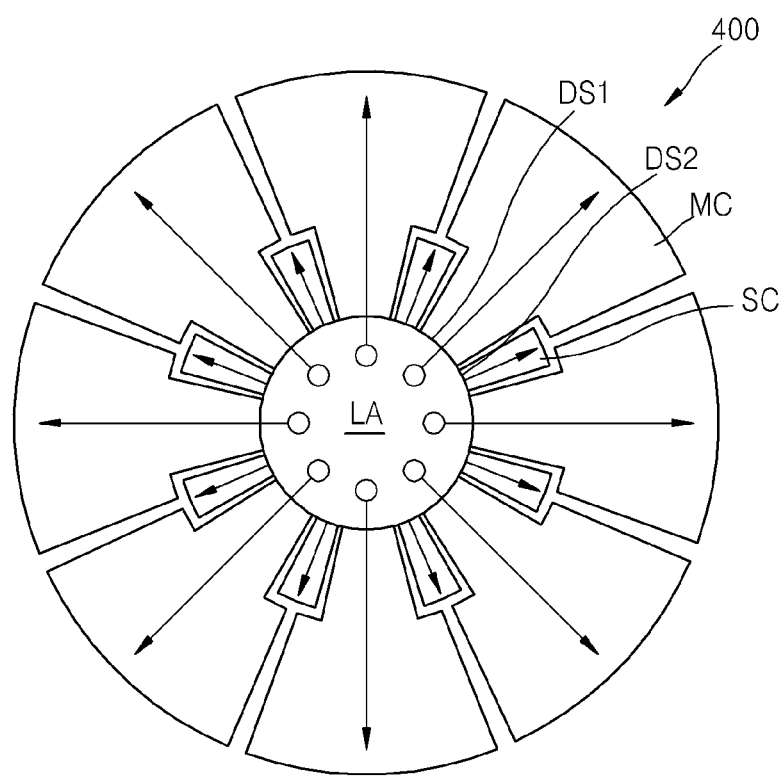
FIG. 8 illustrates a channel structure which may be included in a curvature control device according to another exemplary embodiment.
Figure 9:
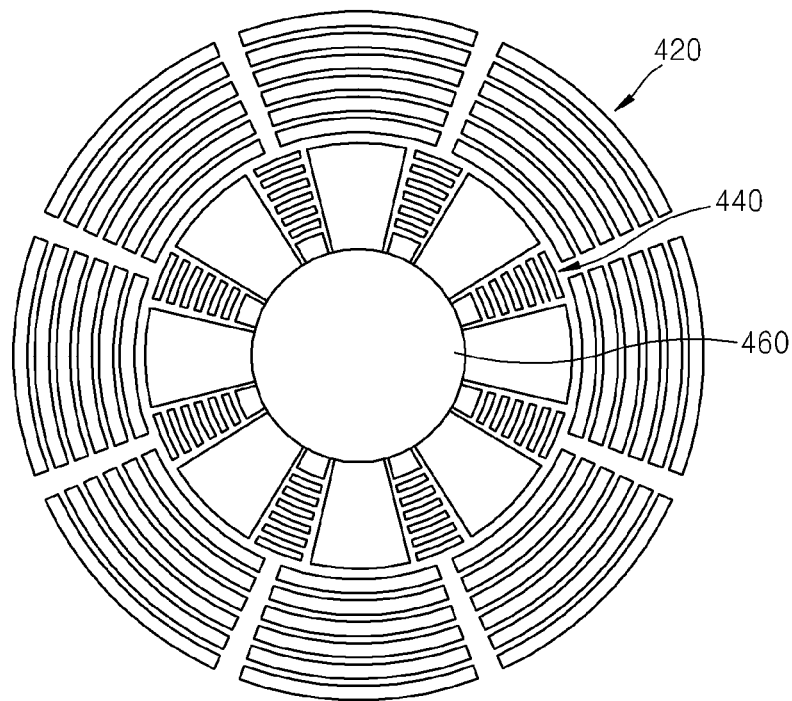
FIG. 9 illustrates an electrode structure which may be included in the channel structure of the curvature control device of FIG. 8.

FIG. 8 illustrates a channel structure which may be included in a curvature control device 400 according to another exemplary embodiment, and FIG. 9 illustrates an electrode structure which may be included in a channel structure of the curvature control device 400 of FIG. 8.

The curvature control device 400 has a channel structure and an electrode structure in which positions of a first driving surface DS1 and a second driving surface DS2 are varied in a radial direction of a lens area LA.

A channel area includes a plurality of main channels MC and a plurality of sub-channels SC, and each of the main channels MC and each of the sub-channels SC are alternately arranged in a circumferential direction.

The plurality of main channels MC and the plurality of sub-channels SC each include a first electrode portion 420 and a second electrode portion 440, respectively. The first electrode 420 includes at least one electrode that has a cut-away ring shape or a cut-away fan-shape and is coated with an insulating material. The second electrode 440 includes at least one electrode that has a cut-away ring shape or a cut-away fan-shape and is coated with an insulating material. While the electrodes having a cut-away fan-shape and the electrodes having a partial ring shape are illustrated as being separated from one another in a radial direction, the electrodes may have other shapes with which the positions of the first driving surface DS1 and the second driving surface DS2 are varied in a radial direction.

Figure 10:
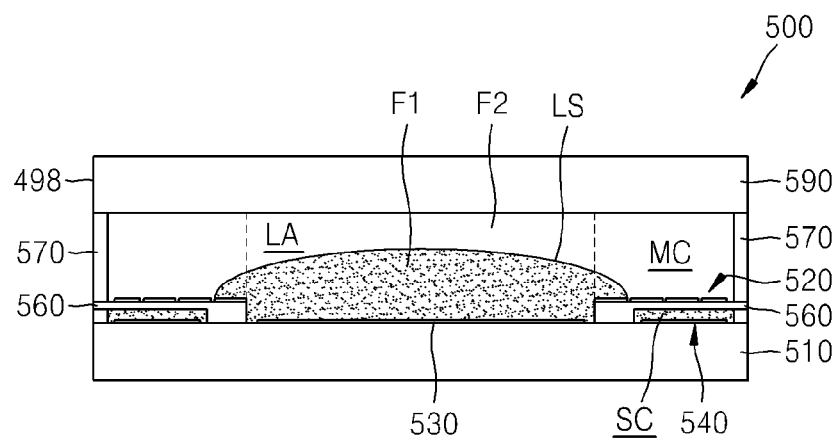
FIG. 10 is a side cross-sectional view schematically illustrating a structure of a curvature control device according to another exemplary embodiment.
Figure 11:
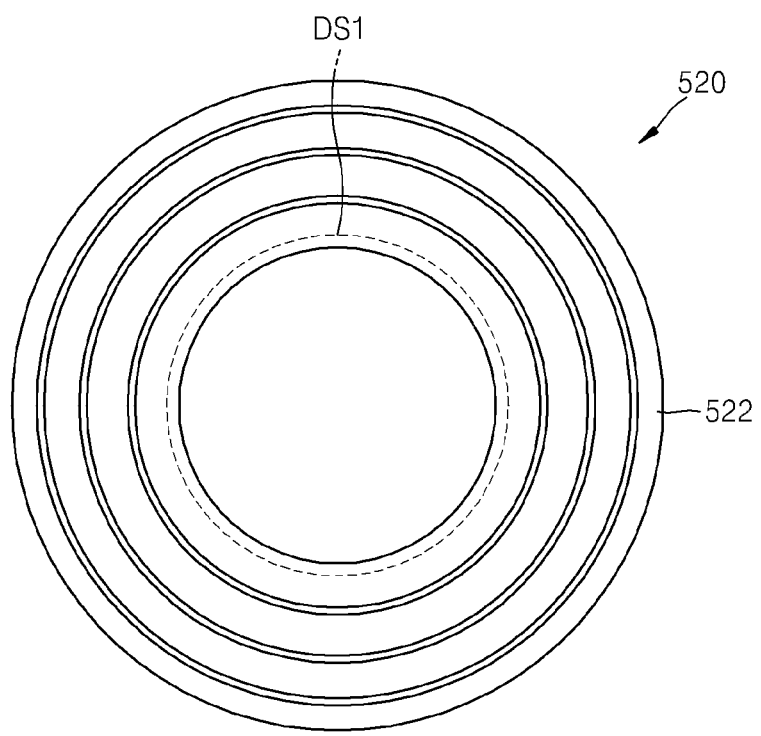
FIG. 11 illustrates an exemplary structure of a first electrode portion of the curvature control device of FIG. 10.
Figure 12:
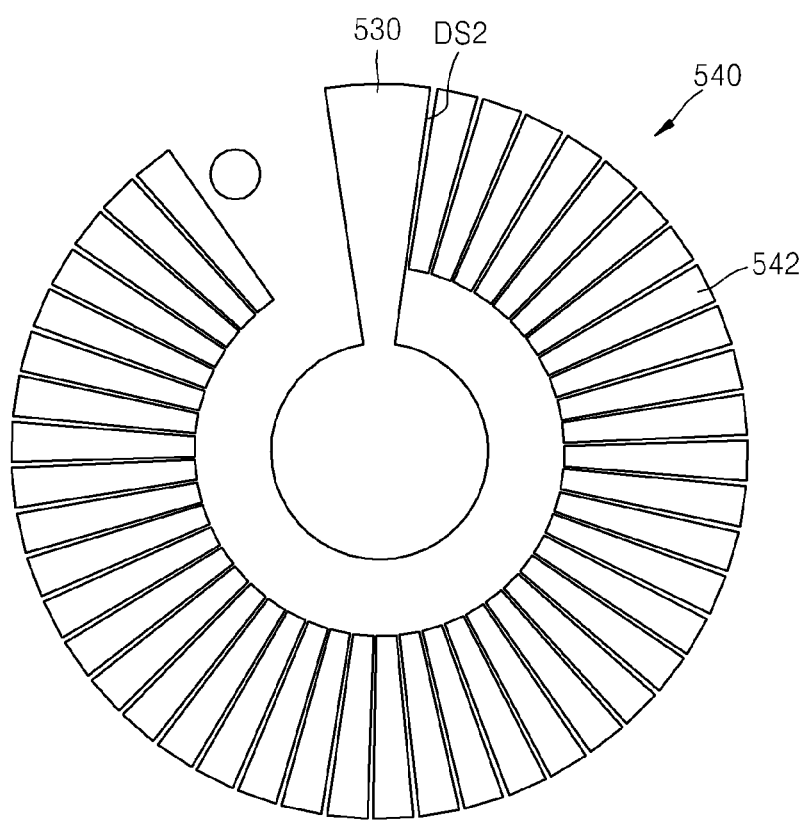
FIG. 12 illustrates an exemplary structure of a second electrode portion of the curvature control device of FIG. 10.

FIG. 10 is a side cross-sectional view schematically illustrating a structure of a curvature control device 500 according to another exemplary embodiment, FIG. 11 illustrates exemplary structures of a main channel MC and a first electrode portion 520 of the curvature control device 500 of FIG. 10, and FIG. 12 illustrates exemplary structures of a sub-channel SC and a second electrode portion 540 of the curvature control device 500 of FIG. 10.

The curvature control device 500 has a channel structure in which a position of a first driving surface DS1 is varied in a radial direction of a lens area LA, and a position of a second driving surface DS2 is varied in a circumferential direction of the lens area LA.

A chamber 498 may include a lower substrate 510, an intermediate structure 560, an upper substrate 590, and a spacer 570.

A first electrode portion 520 formed in the main channel MC includes a plurality of electrodes 522 that have a ring shape, are coated with an insulating material, and are spaced apart from one another in a radial direction. The first electrode portion 520 may be formed on an upper surface of an intermediate structure 560. A second electrode portion 540 formed in the sub-channel SC includes a plurality of electrodes 542 that have a cut-away fan-shape or trapezoidal shape and are coated with an insulating material, and are spaced apart from one another in a circumferential direction. The second electrode portion 540 may be formed on an upper surface of the lower substrate 510. Also, a grounding electrode 530 that is disposed on an upper surface of the lower substrate 510 so as to contact a first fluid F1 may be further included. The position and shape of the grounding electrode 530 is not limited to that illustrated in FIG. 12. The lens area LA may be coated with a material having hydrophilic properties; and when the grounding electrode 530 having a form as illustrated in FIG. 12 is formed, a material having hydrophilic properties may be coated on the grounding electrode 530.

According to the current exemplary embodiment, a position of the first driving surface DS1 in the main channel MC is varied from a center portion and in a radial direction according to a voltage selectively applied to one of the ring-shaped electrodes 522. Thus, curvature of the lens surface LS may be varied rapidly as a fluid quickly flows. The sub-channel SC is used to vary a position of the second driving surface DS2 in a circumferential direction, and is in charge of relatively minute curvature variation.

Figure 13:
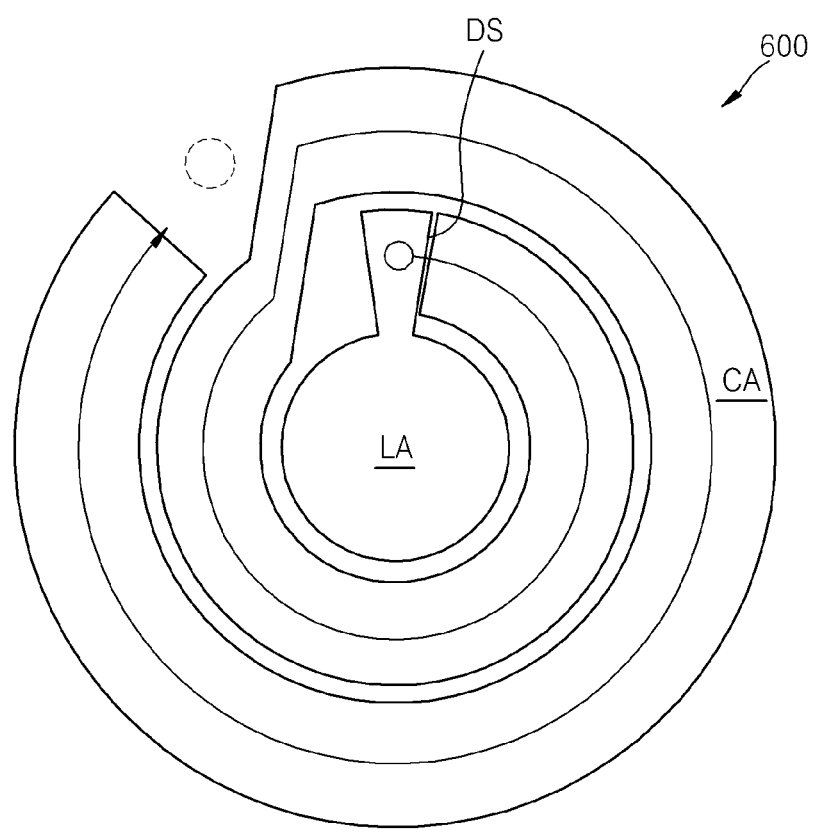
FIG. 13 illustrates a channel structure which may be included in a curvature control device according to another exemplary embodiment.
Figure 14:
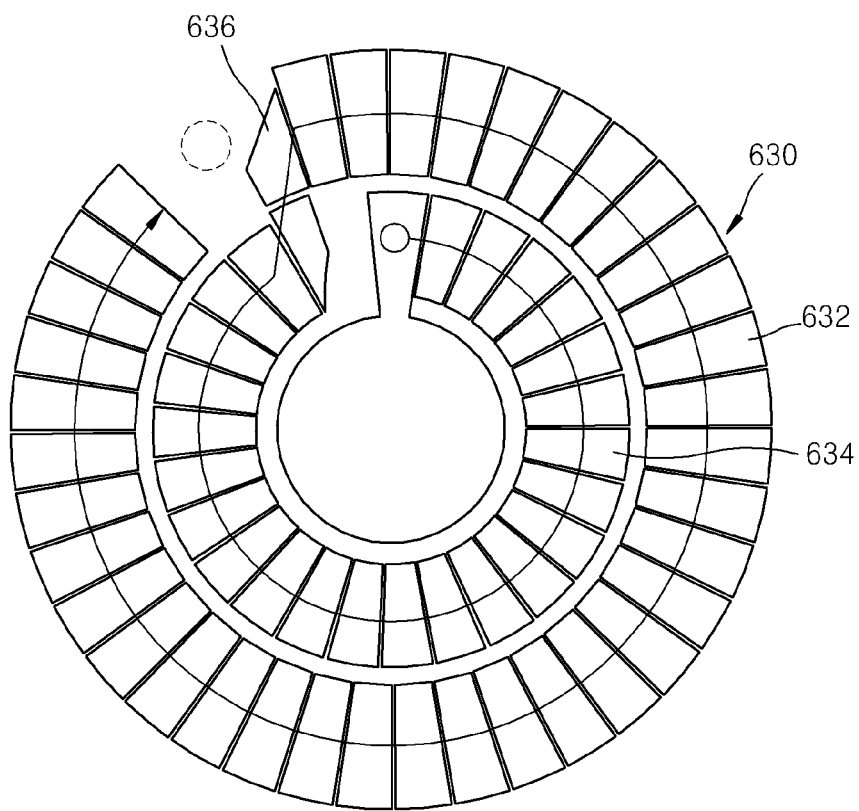
FIG. 14 illustrates an electrode structure which may be included in the channel structure of the curvature control device of FIG. 13.

FIG. 13 illustrates a channel structure which may be included in a curvature control device 600 according to another exemplary embodiment, and FIG. 14 illustrates an electrode structure which may be included in the channel structure of the curvature control device 600 of FIG. 13.

In the curvature control device 600, a channel area in which a position of a driving surface DS is varied is a single area, and the position of the driving surface DS is varied in a circumferential direction surrounding a lens surface area LA.

An electrode portion 630 includes a plurality of electrodes 634 that are arranged in a circumferential direction of a first radius, have a cut-away fan-shape or trapezoidal shape, and are coated with an insulating material and a plurality of electrodes 632 that are arranged in a circumferential direction of a second radius that is greater than the first radius, have a cut-away fan-shape or trapezoidal shape, and are coated with an insulating material. A connection electrode 636 may be further disposed so that a fluid may flow in a space between the electrodes 634 arranged in the circumferential direction of the first radius and the electrodes 632 arranged in the circumferential direction of the second radius.

The curvature control device 600 according to the current exemplary embodiment includes a single channel area which is not divided into a main channel and a sub-channel, and this indicates that a control length of a channel is maximized in this electrode structure. The electrodes 632, the electrodes 634, and the connection electrode 636 may have the same surface area, but are not limited thereto.

Figure 15:
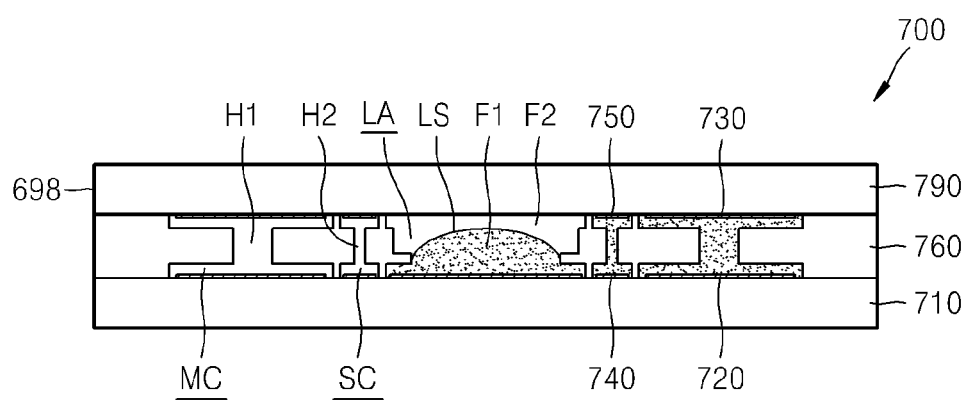
FIG. 15 is a side cross-sectional view schematically illustrating a structure of a curvature control device according to another exemplary embodiment.

FIG. 15 is a side cross-sectional view schematically illustrating a structure of a curvature control device 700 according to another exemplary embodiment.

The curvature control device 700 has a two-layer structure including a main channel MC and a sub-channel SC. That is, a chamber 698 is formed by a lower substrate 710, an upper substrate 790, and an intermediate structure 760. A first electrode portion 720 is disposed on an upper surface of the lower substrate 710 in the main channel MC, and a third electrode portion 730 is disposed on a lower surface of the upper substrate 790. In addition, a second electrode portion 740 is disposed on the upper surface of the lower substrate 710 in the sub-channel SC, and a fourth electrode portion 750 is disposed on the lower surface of the upper substrate 790. The first electrode portion 720, the second electrode portion 740, the third electrode portion 730, and the fourth electrode portion 750 may have the structure of the electrode portions according to exemplary embodiments described above. Also, an electrode portion may be further included on an upper surface and/or a lower surface of the intermediate structure 760. Accordingly, a control length of a fluid may be further increased, and relatively minute control of a fluid is possible, and a control speed of a fluid may be increased, and a chip size may be reduced.

Figure 16:
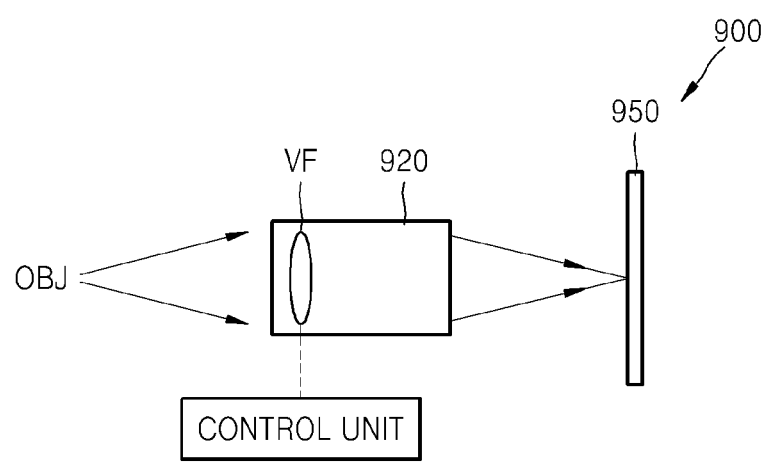
FIG. 16 is a schematic view illustrating imaging apparatus, according to an exemplary embodiment.

FIG. 16 is a schematic view illustrating imaging apparatus 900 according to an exemplary embodiment.

Referring to FIG. 16, the imaging apparatus 900 includes an imaging lens unit 920 including a variable-focus lens VF, a control unit, and an image sensor 950.

The variable-focus lens VF may use any one of the above-described curvature control devices. The imaging lens unit 920 may further include, in addition to the variable-focus lens VF, one or more lenses when necessary. The control unit controls a voltage for adjusting a curvature of a lens surface of the variable-focus lens VF.

The image sensor 950 converts an optical image of an object OBJ formed by the imaging lens unit 920 into an electrical signal. The image sensor 950 may be a charge coupled device (CCD), a complementary metal-oxide semiconductor (CMOS), or the like.

As the curvature of the lens surface of the variable-focus lens VF is adjusted, a focal length of the imaging lens unit 920 varies, and thus, auto-focusing or enlarging/downsizing of the object OBJ may be performed.

As described above, according to one or more of exemplary embodiments, the curvature control device is operated and the method of controlling curvature is performed by using an electrofluidic method based on an electrowetting technique. Thus, curvature of a lens surface may be varied by using only electrical wiring without using an external pump or machine.

Moreover, flows of two fluids are adjusted by combining a main adjustment with a relatively large basic unit of flow amount and a sub-adjustment with a relatively small basic unit of flow amount in a channel area, and thus a lens surface may be adjusted more precisely. Also, since a flow path, which is a path of a fluid, is in a circumferential direction surrounding the lens surface, the lens surface may be adjusted more precisely.

By using the curvature control device according to one or more of exemplary embodiments, variation in curvature of the lens surface may be maximized, and the curvature control device may be applied to imaging apparatus as a variable-focus lens.

The foregoing exemplary embodiments and advantages are merely exemplary and are not to be construed as limiting. The present teaching can be readily applied to other types of apparatuses. Descriptions of features or aspects within each described above exemplary embodiment should typically be considered as available for other similar features or aspects in other exemplary embodiments. Also, the description of the exemplary embodiments is intended to be illustrative, and not to limit the scope of the claims, and many alternatives, modifications, and variations will be apparent to those skilled in the art.

What is claimed is:

1. A curvature control device comprising:
   a first fluid having a first light transmitting property and a polarity;
   a second fluid that has a second light transmitting property and is not mixed with the first fluid;
   a chamber which forms an inner space for containing the first fluid F1 and the second fluid F2, the chamber comprising a lens area in which an optical interface is disposed between the first fluid and the second fluid and a plurality of channel areas comprising:
      at least one main channel in which a first driving interface is disposed at a first interface between the first fluid and the second fluid to induce a variation in a curvature of the optical interface, and
      at least one sub-channel in which a second driving interface is disposed at a second interface between the first fluid and the second fluid to induce the variation in the curvature of the optical interface; and
   an electrode portion which generates an electric field for varying positions of the first driving interface and the second driving surface,
   wherein the at least one sub-channel adjusts the curvature of the optical interface by one amount and the at least one main channel adjusts the curvature of the optical interface by another amount which is greater than the one amount, and
   the first interface and the second interface are different from one another and from the optical interface.

2. The curvature control device of claim 1, wherein the first fluid is a polar liquid, and the second fluid is a gas or a non-polar liquid.

3. The curvature control device of claim 2, further comprising a grounding electrode formed to contact the first fluid.

4. The curvature control device of claim 1, wherein positions of the first driving interface and the second driving interface are varied in a circumferential direction surrounding the lens area.

5. The curvature control device of claim 4, wherein a position of the first driving interface is varied in a circumferential direction of a first radius, and a position of the second driving interface is varied in a circumferential direction of a second radius that is smaller than the first radius.

6. The curvature control device of claim 1, wherein the chamber comprises:
an upper substrate and a lower substrate that are separated from each other; and
an intermediate structure that is disposed between the upper and lower substrates and divides the lens area and the plurality of channel areas such that the first fluid flows between the areas,
wherein the intermediate structure comprises a lens hole corresponding to the optical interface and a through hole which is a path through which the second fluid flows in the main channel and the sub-channel.

7. The curvature control device of claim 6, wherein the electrode portion comprises a first electrode portion formed in the main channel and a second electrode portion formed in the sub-channel.

8. The curvature control device of claim 7, wherein the first electrode portion comprises an electrode that is formed on the lower substrate, has a form corresponding to the main channel, and is coated with an insulating material.

9. The curvature control device of claim 8, wherein the second electrode portion comprises an electrode that is formed on the lower substrate, has a form corresponding to the sub-channel, and is coated with an insulating material.

10. The curvature control device of claim 7, wherein the positions of the first driving interface and the second driving interface are adjusted by adjusting a voltage applied to each of the first electrode portion and the second electrode portion.

11. The curvature control device of claim 7, wherein the first electrode portion comprises a plurality of electrodes that are arranged on portions of the lower substrate corresponding to the main channel along the circumferential direction of the first radius and have a cut-away fan-shape or trapezoidal shape and are coated with an insulating material.

12. The curvature control device of claim 11, wherein the second electrode portion comprises a plurality of electrodes that are arranged on portions of the lower substrate corresponding to the sub-channel along the circumferential direction of the second radius and have a cut-away fan-shape or trapezoidal shape and are coated with an insulating material.

13. The curvature control device of claim 12, wherein the positions of the first driving interface and the second driving interface are adjusted by selecting an electrode from the plurality of electrodes of the first electrode portion and an electrode of the plurality of electrodes of the second electrode portion, to which a voltage is to be applied.

14. The curvature control device of claim 12, wherein a voltage to be applied to the plurality of electrodes of the first electrode portion and the plurality of electrodes of the second electrode portion is adjusted independently.

15. The curvature control device of claim 13, wherein one electrode of the plurality of electrodes of the first electrode portion is electrically connected to one of three common electrodes, and
the electrodes adjacent to the one electrode are arranged to be connected to remaining two different common electrodes.

16. The curvature control device of claim 13, wherein one electrode of the plurality of electrodes of the second electrode portion is electrically connected to one of three common electrodes, and
the electrodes adjacent to the one electrode are arranged to be connected to remaining two different common electrodes.

17. The curvature control device of claim 6, wherein a portion of the lower substrate corresponding to the lens area is coated with a material having hydrophilic properties.

18. The curvature control device of claim 1, wherein a portion inside the main channel is coated with a material having hydrophilic properties.

19. The curvature control device of claim 1, wherein at least two portions inside the main channel, which are separated from each other, are coated with a material having hydrophilic properties.

20. The curvature control device of claim 1, wherein a portion inside the sub-channel is coated with a material having hydrophilic properties.

21. The curvature control device of claim 1, wherein at least two portions inside the sub-channel, which are separated from each other, are coated with a material having hydrophilic properties.

22. The curvature control device of claim 1, wherein positions of the first driving interface and the second driving interface are varied along a radial direction of the lens area.

23. The curvature control device of claim 22, wherein a plurality of main channels and a plurality of sub-channels are included, which are respectively spaced apart and alternately arranged along a circumferential direction of the lens area.

24. The curvature control device of claim 23, wherein the electrode portion comprises a first electrode portion formed in each of the plurality of main channels and a second electrode portion formed in each of the plurality of sub-channels.

25. The curvature control device of claim 24, wherein the first electrode portion comprises at least one electrode that has a cut-away ring shape, a cut-away fan-shape, or a cut-away trapezoidal shape and is coated with an insulating material.

26. The curvature control device of claim 24, wherein the second electrode portion comprises at least one electrode that has a cut-away ring shape, a cut-away fan-shape, or a cut-away trapezoidal shape and is coated with an insulating material.

27. The curvature control device of claim 22, wherein a position of the first driving interface is varied in the radial direction of the lens area, and a position of the second driving interface is varied along a circumferential direction of the lens area.

28. The curvature control device of claim 27, wherein the electrode portion comprises a first electrode portion formed in the main channel and a second electrode portion formed in the sub-channel,
wherein the first electrode portion comprises first electrodes that have a ring shape, are coated with an insulating material, and are spaced apart from one another in a radial direction, and
second electrode portion comprises second electrodes that have a cut-away fan-shape or trapezoidal shape, are coated with an insulating material, and are spaced apart from one another in the circumferential direction.

29. A curvature control device comprising:
a first fluid having a first light transmitting property and a polarity;
a second fluid that has a second light transmitting property and is not mixed with the first fluid;
a chamber which forms an inner space for containing the first fluid F1 and the second fluid F2, the chamber comprising a lens area in which an optical interface is disposed between the first fluid and the second fluid, and a plurality of channel areas in which another interface between the first fluid and the second fluid functions as a driving interface for inducing a variation in a curvature of the optical interface; and an electrode portion which generates an electric field for varying a position of the driving interface, wherein the position of the driving interface is varied in a circumferential direction surrounding the optical interface.

30. The curvature control device of claim 29, wherein the electrode portion comprises:

a plurality of first electrodes that is arranged along a circumferential direction of a first radius, has a cut-away fan-shape or trapezoidal shape, and is coated with an insulating material; and a plurality of second electrodes that is arranged along a circumferential direction of a second radius that is greater than first radius, has a cut-away fan-shape or trapezoidal shape, and is coated with an insulating material.

31. An imaging apparatus comprising:

an imaging lens unit including the curvature control device of claim 1;

a control unit configured to control a voltage for adjusting the curvature of the optical interface of the curvature control device; and an image sensor which converts an optical image formed by the imaging lens unit to an electrical signal.

32. A method of adjusting a curvature of an optical interface disposed between two fluids that are transmittive and have different refractive indices, wherein the curvature is adjusted by using flows of the two fluids, the method comprising:

forming a lens area including the optical interface and a channel area for adjusting the flows of the two fluids, in a space where the two fluids are contained; and adjusting the flows of the two fluids by combining a main adjustment operation with a relatively large basic unit of flow amount and a sub-adjustment operation with a relatively small basic unit of flow amount in the channel area.

* * * * *